Figure 1:
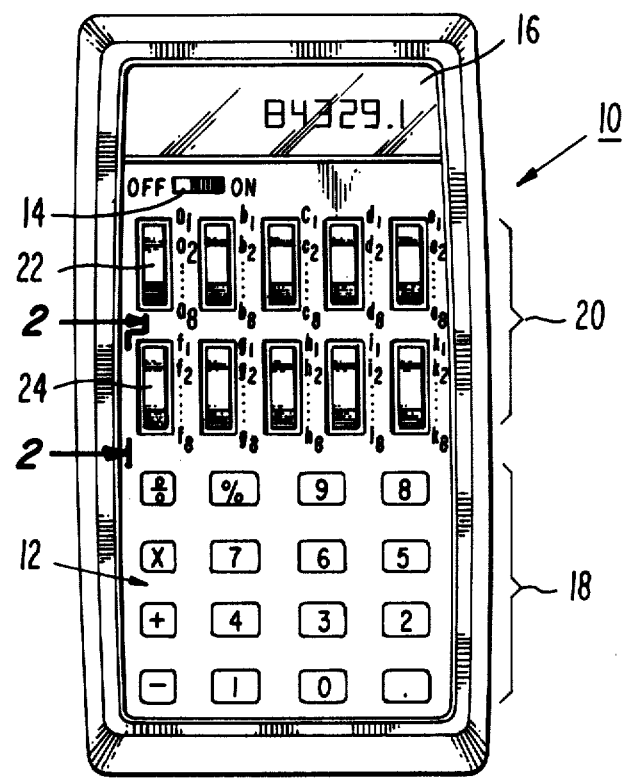

United States Patent [19]

Harayda

[11] 4,120,044

[45] Oct. 10, 1978

[54] DATA ENCODING KEYBOARD

[75] Inventor: George Michael Harayda, Middlesex, N.J.

[73] Assignee: RCA Corporation, New York, N.Y.

[21] Appl. No.: 723,955

[22] Filed: Sep. 16, 1976

[51] Int. Cl.² ........................... G06F 3/02; G06F 7/38
[52] U.S. Cl. ............................. 364/900; 340/365 S; 364/709; 200/11 TW; 200/159 A; 200/155 R; 200/5 A
[58] Field of Search ................ 340/365 R, 365 S; 235/156, 152; 200/11 TW, 159 A, 155, 5 A; 364/900 MS File, 709

[56] References Cited

U.S. PATENT DOCUMENTS

| 3,703,613 | 11/1972 | Abel | 200/11 TW |
| 3,772,597 | 11/1973 | Stover | 340/365 X |
| 3,870,840 | 3/1975 | Rivetta et al. | 200/5 A |
| 3,990,053 | 11/1976 | Evans | 340/172.5 |
| 4,007,364 | 2/1977 | Ojima et al. | 235/152 |

Primary Examiner—Mark E. Nusbaum
Attorney, Agent, or Firm—H. Christoffersen; Samuel Cohen; William Squire

[57] ABSTRACT

A data encoding keyboard for use in electronic processing systems such as electronic calculators includes a pushbutton encoded thumbwheel switch. A plurality of cams secured to the switch define different codes in accordance with the angular orientation of the thumbwheel. The cams engage contacts on a printed circuit matrix adjacent the thumbwheel when the thumbwheel is depressed.

8 Claims, 8 Drawing Figures

U.S. Patent    Oct. 10, 1978    Sheet 1 of 3    4,120,044

U.S. Patent Oct. 10, 1978 Sheet 3 of 3 4,120,044

DATA ENCODING KEYBOARD

The present invention relates to manually-operated keyboards for the selective energization of electrical conductors in accordance with a predetermined code.

Keyboard encoding schemes are well known and useful for encoding data for entry into computers, calculators, communication transmission systems and other electronic systems. Prior art keyboard encoding schemes include matrixes and the like using diodes, triodes or relay devices. A typical matrix arrangement is described in U.S. Pat. No. 3,863,060. Here each key in the keyboard, when depressed, causes the generation of a code for entering information into the electronic processing circuit associated with the keyboard or for causing the electronic system to perform a given electronic operation. However, current microelectronic processing systems may have a processing capability for more codes than there are keys available for entering such codes. This problem is especially acute in small hand-held calculators wherein the size of the calculator is limited to the keyboard itself and the display means.

One solution to this problem is the use of a prefix key or keys for establishing a prefix code. This coded key is used in conjunction with other information or operation encoding keys for providing a double function for a given key. As disclosed in the aforementioned patent, one prefix key enables a number of keys to have double control functions in the calculator. There exist other calculators commercially available which have a number of prefix keys which multiply the functions of certain of the keys on the keyboard.

An alternate arrangement for providing multiple functions for keys is disclosed in U.S. Pat. No. 3,290,439. Its system includes a thin selectively perforated insulating sheet which is positioned between moveable fingers operated by keys, and a circuit board matrix, to prevent the selection of certain conductors by each key. The encoding scheme may be changed by removing the thin insulating sheet with one set of codes and replacing it with a second sheet having a second set of codes. However, once the perforated sheet is inserted, each key in the keyboard has but one code.

The problem, with the matrix keyboard having the prefix key is that the prefix key, which is an extra key, must be depressed prior to the entering of a desired controlling function. In complicated electronic processing formulae, the user may be required to perform large number of extra steps in the use of such prefix keys. Further, there is the possibility of error should the operator inadvertently fail to depress the prefix key.

Our improved key according to one aspect of the present invention is one which can be oriented in several different ways, each representing a code. The key also is moveable between open and closed positions, in the latter of which its code may be sensed. These and other aspects of the invention are discussed in detail below.

In the Drawing

Figure 4:
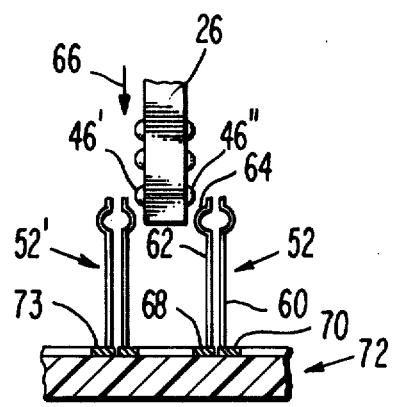
Figure 3:
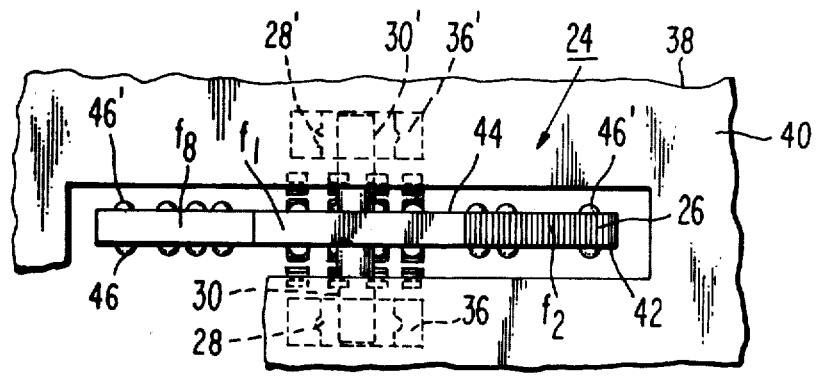
Figure 2:
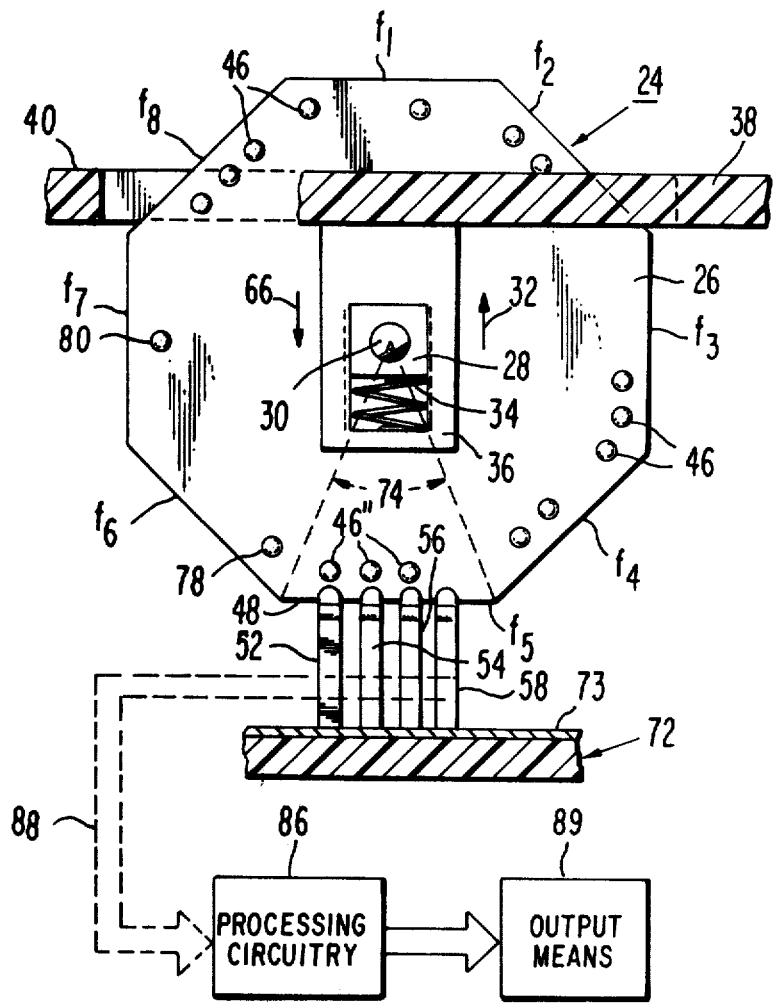
Figure 5:
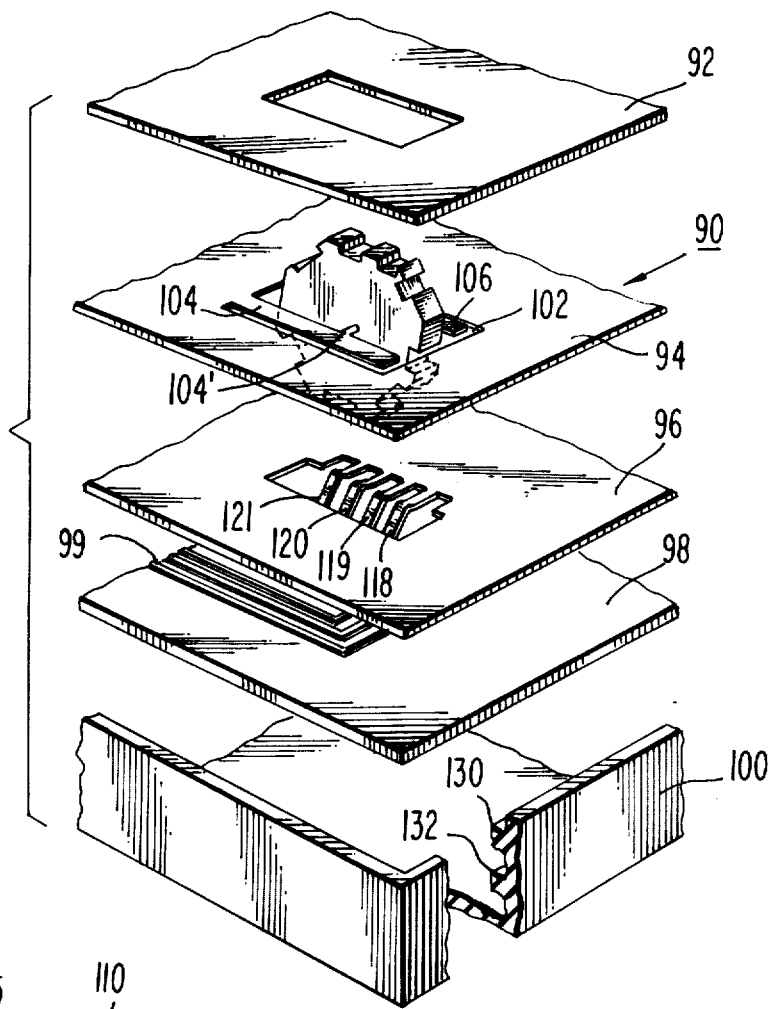
Figure 6A:
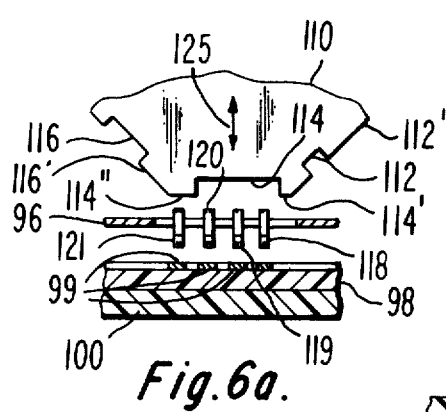
Figure 6B:
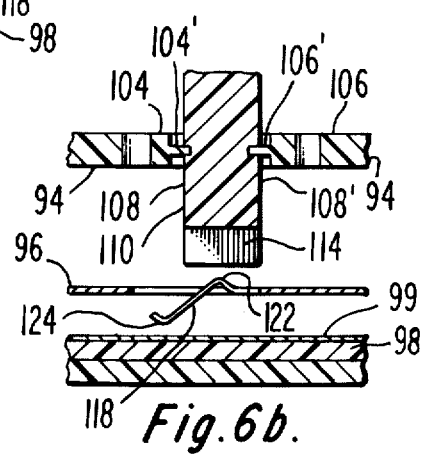
Figure 6C:
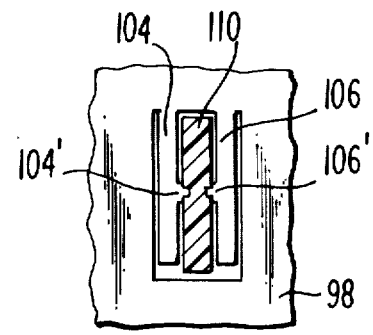

FIG. 1 is a plan view of a keyboard of an exemplary embodiment of the present invention, FIG. 2 is a side elevational fragmentary and block diagrammatic view of one of the pushbutton switches of FIG. 1, taken along lines 2—2, FIG. 3 is an enlarged plan view of a portion of the embodiment of FIG. 2, FIG. 4 is a partial end view of the embodiment of FIG. 2, FIG. 5 is an exploded fragmentary isometric view of a keyboard of a second embodiment of the present invention, and FIGS. 6a, 6b and 6c are fragmentary respective side, end, and plan sectional views of the thumbwheel switch of FIG. 5.

In the detailed discussion which follows, a hand-held calculator is described which embodies the invention. It is to be understood, however, that this is intended as an example only as the invention is also useful in data-encoding keyboards for many other systems.

In FIG. 1, hand-held calculator 10 includes a keyboard input module 12 and a display 16. Keyboard module 12 includes an on-off switch 14, a plurality of conventional single acting numeric and function control keys 18, and a plurality of encoded function control keys 20. All of the keys 18 and 20 are in a normally open switch condition as is usual in the conventional calculator.

The keys 20 as constructed and operated in accordance with the present invention operate in a significantly different manner than the conventional keys 18. Each of the keys 20 can be individually set to one of a plurality of control function positions. For example, key 22 may be set to any one of eight different functions $a_1$–$a_8$. In a like manner, the remaining keys 20 each may be set to a like number of different functions, for example $b_1$–$b_8$ _ $k_1$–$k_8$. Each of the keys 20 can be independently set. If desired, however, in accordance with a particular implementation, several of the keys 20 may be provided with one or more of the same functions. It will thus be apparent that a significant difference between the exemplary calculator 10 of FIG. 1 and the calculators of the prior art is the elimination of prefix keys. In operation, the various keys 20 initially are rotated to desired positions as called for by a particular program. Then they are depressed in a particular sequence, according to the steps in the program.

Details of one of the pushbutton keys 24 are shown in FIGS. 2–4. Key 24 includes an octagon-shaped thumbwheel 26 rotatably mounted in slideable bearings 28 and 28' via connecting shafts 30 and 30'. (The unprimed elements on one side of the key and the primed elements occupy complementary positions on the other side of key 24.) Bearings 28 and 28' are resiliently urged in the normally open switch position direction 32 by respective spring 34 and 34', only spring 34 being visible in FIG. 2. Bearing 28 is slideably mounted in a suitable bearing raceway in housing 36 while bearing 28' is similarly mounted in housing 36', FIG. 3. Bearing housings 36 and 36' are secured at the upper end to the front panel of the keyboard 38.

Panel 38 is a relatively thick thermoplastic member or a reinforced sheet member for stiffly supporting the keys 20 illustrated in FIG. 2. The legends $f_1$–$f_8$, represent the eight functions performed by thumbwheel 26, $f_1$ on the upward facing facet indicating the function to which the thumbwheel is preset. Suitable detent means (not shown) may be provided for releasably locking the thumbwheel 26 in a desired position. These detent means may include, for example, a projection on bearing housing 36 spring loaded to wipe against the side of thumbwheel 26 and suitable channels disposed in the sides of the thumbwheel 26 and extending radially outwardly from shafts 30 and 30' for selective engagement with the respective detent projections. The channels also serve to limit the travel of thumbwheel 26 in direction 66.

A suitable legend index may be disposed on a keyboard member 38 upper surface 40 adjacent each key as illustrated in FIG. 1, labelling all of the functions performed by each of the corresponding keys 20. In the alternative, the functions may be color coded in a suitable manner.

There are eight groups of projections 46 (and 46') on each side surface of thumbwheel 26, each group comprising a row of from zero to four projections. Each row is located adjacent and parallel to a different one of the end faces 50 and each row of projections is arranged in a desired code. Projections 46 may be integral with thumbwheel 26 and molded, for example, from a suitable thermoplastic material.

Disposed on each side of the thumbwheel adjacent the lowermost facet 48 are eight upstanding, normally-open contact assemblies 52, 54, 56 and 58 and 52', 54', 56' and 58'. A projection 46 or 46', when present, aligns with one contact assembly in a group of contact assemblies, but does not engage the contact assembly until the thumbwheel is depressed.

FIG. 4, illustrates two of the contact assemblies 52 and 52'. The assembly 52 comprises, by way of example, a pair of upstanding contact elements 60 and 62. The element 62 facing the projection 46" has a cam surface 64 extending transversely toward thumbwheel 26. When the thumbwheel 26 is depressed (direction 66), projection 46" engages cam surface 64 causing electrical contact between the elements 60 and 62.

Elements 60 and 62 are electrically connected to printed circuit conductors 68 and 70 disposed on a printed circuit board 72 in a suitable matrix 73. Each of the elements of assemblies 52–58 and 52'–58' are connected to a separate printed circuit board conductor forming the printed circuit board 72 matrix 73. Such a matrix may be of the type described in U.S. Pat. No. 3,290,439. Closing of the contact elements in a given contact assembly generates by means (not shown) an encoded bit of information.

As already mentioned, the number of projections in each group and their position define the code for that group. If one assumes a projection to represent a 1 and its absence to represent a 0, the code for sector 74 (shown dashed), is 110, and causes switches 52, 54 and 56 to close, when the thumbwheel 26 is despressed. As a second example, if the thumbwheel is rotated to its opposite face, the code 0101 will cause assemblies 54 and 58 to close when the thumbwheel is depressed. The thumbwheel 26 may be rotated both clockwise and counterclockwise. The projections 46' on the opposite side of thumbwheel 26 are also disposed in an encoded arrangement which may be the same or different from that of the corresponding projections 46.

The contact assemblies 52–58 and 52'–58' are electrically connected to the calculator processing circuitry 86 via the matrix 73. This latter connection is represented by the dotted arrow 88. The processing circuitry 86 supplies signals to output means 88 which may include a display such as 16 of FIG. 1.

An alternate embodiment is illustrated in FIGS. 5 and 6a, 6b and 6c, employing a layered keyboard assembly 90, including a cover plate 92, a thumbwheel mounting plate 94, contact support structure 96, a printed circuit board matrix layer 98 and a housing 100. Thumbwheel mounting plate 94 has a suitable cutout 102 in which there are disposed two parallel cantilevered beam members 104 and 106. Preferably, plate 94 may be molded of a suitable thermoplastic material. The members 104 and 106 each have a corresponding thumbwheel mounting shaft 104' and 106', respectively, extending transversely therefrom as seen in FIGS. 6b and 6c. Disposed centrally in each of the sidewalls 108 and 108' of thumbwheel 110 are suitable recesses for receiving the shafts 104' and 106'. As seen in FIG. 6a, thumbwheel 110 includes a plurality of encoded recesses 112, 114, 116 and so forth, extending transversely across respective facets 112', 114' and 116'. Each of the eight facets of the thumbwheel 110 are encoded with suitable transverse recesses.

Disposed directly below the thumbwheel 110 adjacent and in alignment with facet 114' are four horizontally extended cantilevered contacts 118–121, inclusive. As seen in FIG. 6b, illustrating a side view of the contacts 118–121 of FIG. 6a a typical contact 118 has a raised upward extending cam surface 122 and a contact surface 124 spaced from the printed circuit board matrix 99. In the example illustrated, surface 114" of the thumbwheel is adjacent contact 121, and the recess 114 of the thumbwheel is opposite the remaining three contacts 118, 119, 120. This sector of the thumbwheel therefore can be said to represent the code 1000 and when the thumbwheel is depressed, contacts 121 close and the remaining contacts 118, 119 and 120 are disposed in the recess 114 out of engagement with the thumbwheel and thus remain in the open switch condition. Suitable detent and travel limit means (not shown) locate the thumbwheel 110 in the correct angular orientation and limit the vertical travel of the thumbwheel 110 in the direction 125 as described above in connection with the structure of FIG. 2.

As in the embodiment of FIG. 1, each code wheel may be provided with eight (or some other number) of peripheral edges. Each edge may be formed with one or more recesses corresponding to 114 to represent a desired code. For example, if a recess appears in a position corresponding to switches 121 and 120 and the remainder of the edge is not recessed, the code represented is 0011. Rotation of the thumbwheel 110 aligns a new set of encoded recesses adjacent predetermined selected ones of the contacts 118–121, inclusive.

The housing 100 of FIG. 5 has a plurality of transverse extending ribs 130 and 132 for supporting respectively the thumbwheel mounting plate 94 and the contact support structure 96 in suitable spaced relationship. It is to be understood that other encoded switched structures may be constructed and operated in accordance with the present invention.

As shown in FIG. 2, there are eight contact assemblies 52–58 and 52'–58'. It will be appreciated that more or less contact assemblies may be provided in accordance with a given desired encoding scheme. Further, the contact assemblies may, in accordance with a given desired implementation, be provided on only one side of the thumbwheel 26.

What is claimed is:

1. In an electronic system of the type including keyboard means for entering information into the system, processing means for processing the entered information and for performing selected operations in response to said entered information, and output means for displaying the results of the entered information or selected operation, said processing means performing any one of a plurality of operations in response to the entered information determined by said input means, the input means comprising a plurality of separate, different rotary thumbwheel pushbutton switch means having first and second positions coupled to said processing means, each said switch means having a first normally open switch condition when said switch means is in said first position, said switch means including switch encoding means having a plurality of selectable binary encoded second closed switch conditions when said switch means is displaced to said second position, each said closed switch condition entering information or causing said processing means to perform an operation corresponding to the selected binary code of that switch means.

2. The electronic system of claim 1, wherein said switch means comprises
   a rotatably mounted thumbwheel,
   means for mounting the thumbwheel so that the wheel can displace from said first position to said second position,
   a plurality of rotatably selectable separate encoded switch closing means secured to said wheel, and
   switch contact means secured ajacent said wheel, said contact means being responsive to the code of the selected corresponding closing means when said wheel is placed in said second position.

3. The electronic system of claim 1 wherein said switch means includes a first binary encoded member having a plurality of encoded positions, each encoded position corresponding to a separate binary switch code, and a second member adapted to engage said first member when said first member is displaced to said second positon, said second member being responsive to the binary code of said first member only when said first member engages said second member to thereby provide said selected second closed switch condition.

4. The electronic system of claim 3 wherein said first member includes a first plurality of switch engaging means each disposed in an encoded array, said second member including a second plurality of switch engaging means disposed in a given array, certain of said given array engaging the selected encoded array in accordance with the code of said selected encoded array.

5. A rotatable pushbutton switch comprising:
   a support having a surface,
   a thumbwheel member rotatable about a first axis generally parallel to said surface and having M radial sectors, where M is an integer greater than one,
   resilient mounting means secured to said support and including means for resiliently, rotatably mounting said rotatable member and urging said member in a first direction generally normal to said first axis and to said surface to a first position, said resilient mounting means being adapted to permit said member to displace in a second direction normal to said first axis and to said surface to a second position,
   switch encoding means on said rotatable member, representing N binary codes in N respective radial sectors of said member, where N is an integer greater than one, and
   switch means disposed adjacent said rotatable member and responsive to said switch encoding means when said member is in one of said first and second positions to provide a binary encoded switch condition corresponding to a given angular orientation of said member.

6. A pushbutton switch comprising:
   housing means,
   a thumbwheel switch which is moveably secured to the housing means normally biased to one position and which can be depressed to a second position in a first direction, the switch also being so mounted that it can be oriented about an axis normal to said first direction in one of N different ways, where N is an integer greater than one,
   N groups of encoding means on said switch, each such group representing a code, and each being accessible in a different orientation of the switch, and
   decoder means in operative relationship with the switch, responsive to the code which is accessible when said switch is depressed in said first direction, for producing an output representing the accessed code.

7. The switch of claim 6, wherein said switch comprises a thumbwheel rotatably mounted to rotate about said axis and resiliently mounted to said housing means to displace in said first direction.

8. The switch of claim 6 wherein each group of encoding means comprises from O to M contact engaging elements, and said decoder means comprises M contact means, in positions to be engaged, by up to M contact engaging elements, respectively, where M is an integer greater than 1.

* * * * *